United States Patent [19]

Ansley

[11] Patent Number: 4,884,768
[45] Date of Patent: Dec. 5, 1989

[54] JUMPSUIT FOR CONTROLLED FREEFALLING

[76] Inventor: William K. Ansley, 274 Tusculum Rd., Antioch, Tenn. 37013

[21] Appl. No.: 256,470

[22] Filed: Oct. 12, 1988

[51] Int. Cl.$^4$ .............................................. B64D 17/00
[52] U.S. Cl. .................................... 244/143; 2/2.1 R; 2/79; 280/810
[58] Field of Search ................... 244/142, 143, 138 R; 2/79, 80, 81, 82, 2.1 R, 2.1 A, 237; 280/810

[56] References Cited

U.S. PATENT DOCUMENTS

| | | | |
|---|---|---|---|
| 179,171 | 6/1876 | Eager | 2/237 |
| 1,178,165 | 4/1916 | Lupton | 280/810 |
| 1,254,110 | 1/1918 | Bakos | 244/143 |
| 2,156,210 | 4/1939 | Upson | 244/143 |
| 2,213,754 | 9/1940 | Thirnig | 280/810 |
| 3,742,518 | 7/1973 | Garcia | 244/143 |
| 4,077,064 | 3/1978 | Maidon | 2/2.1 R |
| 4,220,299 | 9/1980 | Motter | 244/143 |

Primary Examiner—Galen Barefoot
Attorney, Agent, or Firm—Harrington A. Lackey

[57] ABSTRACT

A jumpsuit for controlled freefalling in which the suit is provided with enlarged expansible wing portions between the sleeve portions and the body portion of the jumpsuit and a wing extender line which extends from each hand of the wearer through each corresponding sleeve portion and inside the wing portion to the waist area of the jumpsuit, where both extender lines pass through a control member. The control member is provided with means for pulling both extender lines away from the suit in order to expand the wing portions when the arms are extended, and are also provided with latch means for latching the extender lines in the expanded positions. Moreover, the control member is further provided with means for rapidly unlatching the latch means to permit free passage of the extender lines back into the suit in order to allow the expansible wing portions to retract toward the wearer's armpits.

9 Claims, 3 Drawing Sheets

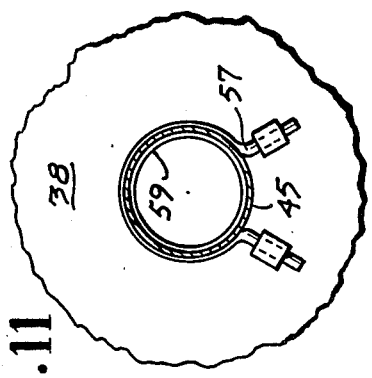
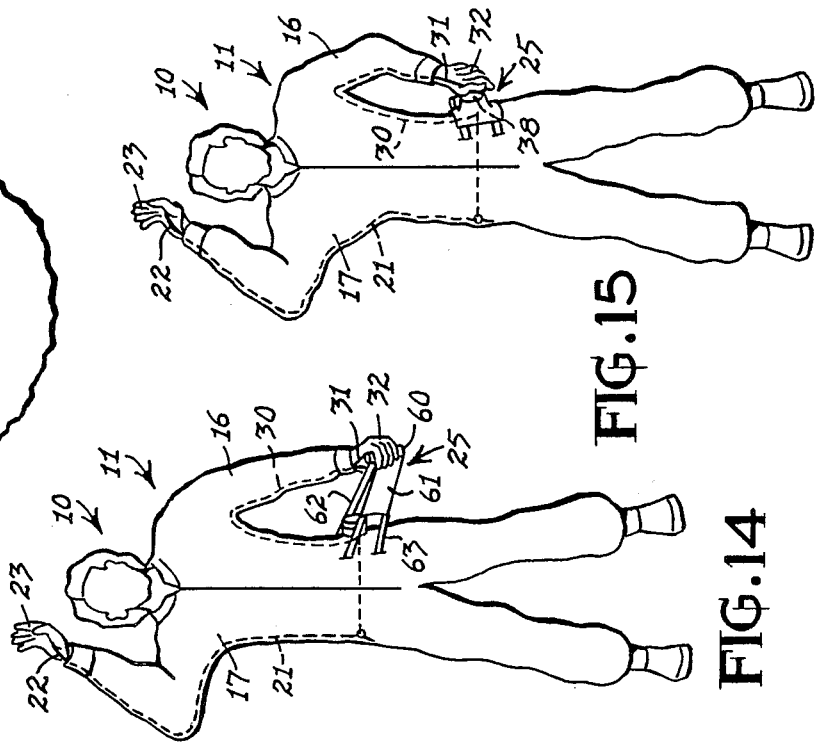
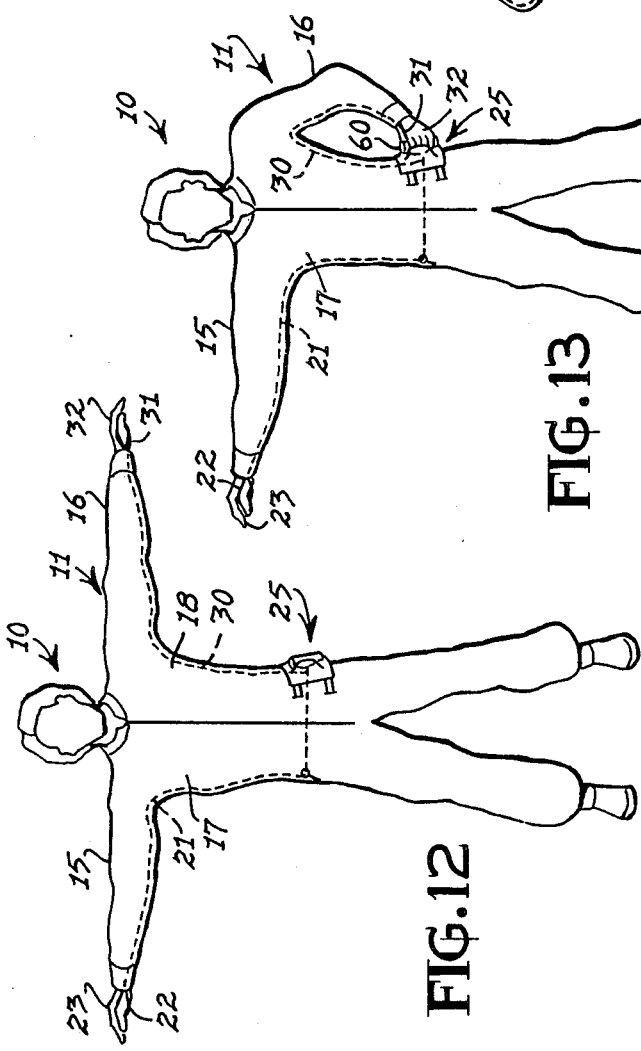
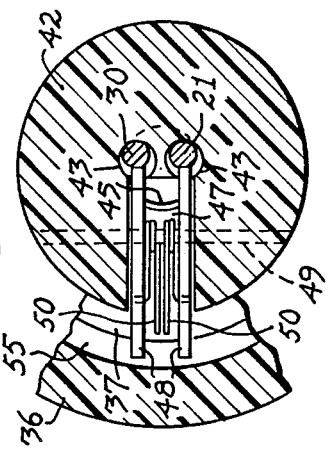
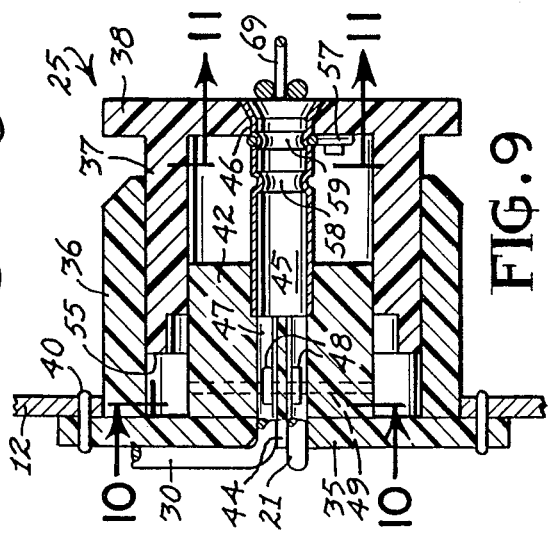

JUMPSUIT FOR CONTROLLED FREEFALLING

BACKGROUND OF THE INVENTION

This invention relates to a jumpsuit for controlled freefalling, and more particularly to a jumpsuit having expansible wing areas and means for controlling the expansion and contraction of the wing areas.

In the late 1960's the art of freefalling in skydiving began to attract increasing numbers of non-military participants. Although military jumpsuits and other skydiving gear were utilized originally, nevertheless, more personalized equipment was desired. Initially, commercial jumpsuit designs were merely replicas of the prevailing military products, which were essentially tight-fitting, with no specialized aerodynamic features.

However, as early as 1973-1974, the burgeoning sport of skydiving was attracting specialized manufacturing including new jumpsuits with features that permitted the wearer to exercise increased control over his rate of descent while freefalling from 100 to 200 miles per hour.

The initial aerodynamic features which instantly swept the market consisted of bloused sleeves and pant legs (a.k.a. bells), and wing areas. Such modified designs permitted freefalling at slower speeds because of the drag produced by the vibrant fluttering of loose fitting bell bottom and bell sleeve suits. The ability of the freefaller to retard his fall rate permitted him to exercise greater control in matching his fall rate with the other skydivers falling with him during the act of "relative work" which involves the building of assorted freefall formations by various numbers of jumpers.

Shortly after the introduction of belled suits, it was discovered that additional material could be included in the armpit area of the suit which could be pulled tight with a string fixed within the armpit area by fully extending one's arms. The taut armpit material produced an increased wing area under each arm from the wrist to the waist which would catch additional air, thereby creating more drag upon the suit to permit the jumper to attain a slower speed. This suit feature, commonly referred to as wings, swept the market along with bell legs and arms, and both features were included in virtually every jumpsuit manufactured in the late '70's and early '80's.

However, in the early to mid 1980's, the large suits with bells and wing areas created problems in the formation of large freefall patterns of jumpers, including up to 100 or more persons. The fall rate of various jumpers was erratic because of the unintentional, though unavoidable, stretching tight and then loosening of the bell and wing areas, which varied the individual jumpers fall rates thereby creating difficulty in forming the various sky patterns.

The existing wing areas in jumpsuits slow a jumper's fall rate primarily when the jumper exerts tension on the direct line from his wrist to his waist which is fixed at both ends. Although the wing area will cease to catch air when the jumper's arms are bent at the elbow to loosen the fixed extender lines, at times he must reach out to effect a particular maneuver, and thereby inadvertently extend the wing area. Also, other jumpers who grab one jumper's arms in freefall, inadvertently pull the wing area tight and slow that jumper's fall speed without the jumper's ability to control the contraction and expansion of the wing area.

Accordingly, since partial control of the wing surfaces in freefall maneuvers creates more problems than it solves, current jumpsuit designs have dropped the expansion feature entirely so that all jumpers will fall at a more uniform rate with no loss of control over the fall rate.

SUMMARY OF THE INVENTION

It is therefore an object of this invention to provide a jumpsuit which will provide more control over the speed of the skydiver or jumper during freefalling maneuvers.

Another object of this invention is to provide a jumpsuit with a wing area which can be quickly controlled by the wearer at all times during free flight, and which is of simple construction and function.

A further object of this invention is to provide rapidly and reliably controlled wing area expansion and contraction in a jumpsuit, since a freefall time period rarely exceeds 60 seconds in duration, most of which must be devoted to concentrating on the desired freefall performance with a minimum of interruption.

The jumpsuit made in accordance with this invention includes enlargeable wing areas within the armpit portions of the suit carrying wing extender lines. The lines are relatively fixed at their outer ends and their inner ends extend through a control member capable of permitting the inner ends of the extender lines to be pulled outwardly. The inner end portions of the lines are automatically locked in their pulled extended position, yet readily unlocked to permit retraction of the lines to collapse the wing areas.

The control member made in accordance with this invention is preferably mounted in the area of the waist of the jumpsuit readily accessible for manual operation with one hand of the wearer. The wearer may rapidly pull the handle member of the control member to pull the extender lines out from the suit to a locked or latched position, in order to expand the wing areas when the arms are extended, and may quickly depress a de-actuator or unlatching button to release the extender lines from the latched position, permitting retraction of the lines to collapse the wing areas.

Another object of this invention is to provide a control member located at a single point or position on a jumpsuit for simultaneous control of the extender lines in both wing areas of the jumpsuit.

BRIEF DESCRIPTION OF THE DRAWINGS

FIG. 9 is a fragmentary, sectional elevation taken along the line 9—9 of FIG. 8;

FIG. 10 is a fragmentary, sectional elevation taken along the line 10—10 of FIG. 9;

FIG. 11 is an enlarged fragmentary, sectional elevation taken along the line 11—11 of FIG. 9;

FIG. 12 is a front elevational view of a skydiver in the jumpsuit made in accordance with this invention, with his arms extended and the wing areas collapsed;

FIG. 13 is a view similar to FIG. 12 in which the wearer is grasping the handle member preparatory to extracting the extender lines;

FIG. 14 is a view similar to FIG. 13 illustrating the skydiver with his right elbow bent and his left hand pulling the handle member to its fully extended position; and FIG. 15 is a view similar to FIG. 14 in which the skydiver is depressing the de-actuator button member to release the extender lines.

DESCRIPTION OF THE PREFERRED EMBODIMENTS

Figures 1, 2, 3:
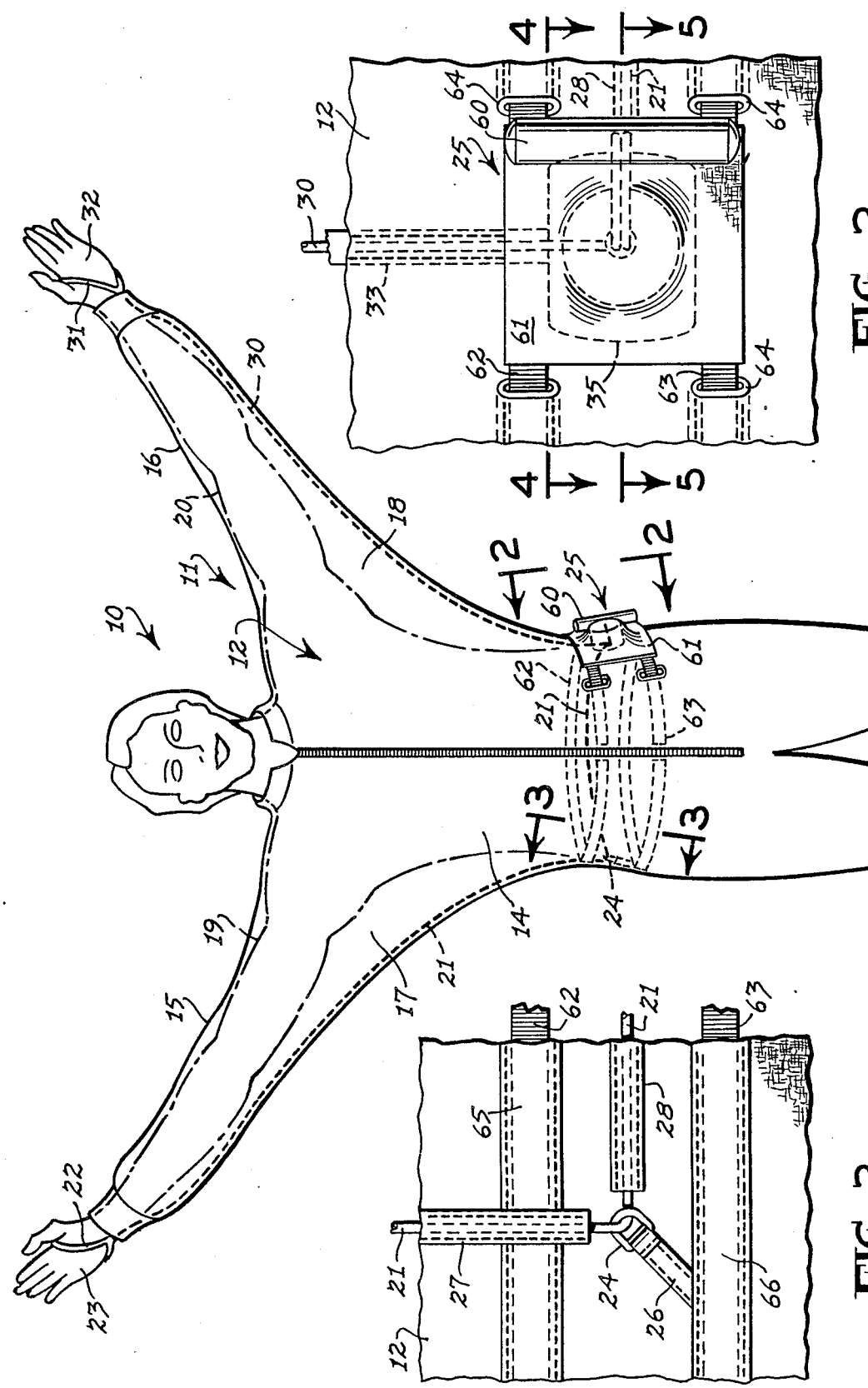
FIG. 1 is a fragmentary, front elevational view of a skydiver wearing a jumpsuit made in accordance with this invention, in which the diver's arms are extended and the wing portions are in an expanded operative position.
FIG. 2 is an enlarged fragmentary, side elevational view taken along the line 2—2 of FIG. 1.
FIG. 3 is an enlarged fragmentary, inside elevational view of the jumpsuit taken along the line 3—3 of FIG. 1, illustrating the right extender line mounting.

Referring now to the drawings in more detail, FIGS. 1, 12, 13, 14, and 15 disclose a skydiver or wearer 10 wearing a jumpsuit 11 made in accordance with this invention, without a parachute.

The jumpsuit 11 includes a suit body 12 adapted to fit the wearer 10 and including a central torso portion 14, a right sleeve portion 15, and a left sleeve portion 16. Each of the sleeve portions 15 and 16 are joined to the torso portion 14 by wing portions or wing areas 17 and 18 respectively, including expansible or enlargeable material, such as stretch knit fabric, beneath the armpits of the wearer 10.

Extending along the bottom of the right sleeve portion 15, the right wing portion 17, and the torso portion 14 is an elongated, flexible, but inextensible, right extender line 21, with its upper or outer end portion held in a relatively fixed position. As illustrated in FIG. 1, the outer end portion of the right extender line 21 terminates in a right hand loop 22 which fits around the right hand 23 of the wearer 10.

As best illustrated in FIGS. 1, 2, and 3, the right extender line 21 extends downward along the interior surface of the suit body 12. The direction of the right extender line 21 is then changed by its passage through a guide loop 24, so that the right extender line 21 may extend around the rear interior surface of the waist area of the suit body 12 until the line 21 passes through a control member 25. As best illustrated in FIG. 3, the guide loop 24 may be attached to the interior surface of the suit body 12 by an anchor strap 26 which is stitched to the fabric of the suit body 12. The vertically extending portion of the right extender line may pass through a fabric tunnel or sleeve 27 which is also stitched to the interior surface of the suit body 12. The horizontally extending portion of the right extender line 21, leaving the guide loop 24, may be contained within an elongated waist guide sleeve 28 stitched entirely around the rear interior surface of the torso portion 24, until the right extender line 21 exits to pass through the control member 25.

A left extender line 30, preferably of the same material as the right extender line 21, and also flexible and inextensible, is located in the bottom of the sleeve portion 16 and the left wing portion 18, as well as the torso portion 14. The outer or upper end portion of the left extender line 30 is also fixed relative to the sleeve 16. Again, the outer end portion of the extender line 30 terminates in a left hand loop 31 which may be received over the wearer's left hand 32, is illustrated in FIG. 1. The opposite or inner end portion of the left extender line 30 may also be guided through a vertical fabric sleeve 33 stitched to the interior surface of the torso portion 14 so that the inner end portion of the left extender line 30 exits at a location adjacent to the control member 25 and then passes through the control member 25.

The control member 25 includes a base plate 35 to which is fixed a cylindrical control housing 36 having an interior cylindrical surface slidably receiving the exterior cylindrical surface of a substantially cylindrical plunger member 37. the exterior of the plunger member 37 is provided with an enlarged button plate 38 which provides an exposed surface for manually forcing the plunger member 37 into the cylindrical housing 36 and also limits the depth of the slidable movement of the plunger member 37 within the cylindrical control housing 36.

The control housing 36 preferably extends through a corresponding hole 39 in the fabric of the suit body 12 and the base plate 35 is placed against and secured to the interior surface of the wall of the suit body 12. The base plate 35 may be secured by stitches 40, or by "Velcro" fasteners, to the suit body 12 to facilitate adjustment in order to accommodate various types of parachute harness.

Projecting outward from the base plate 35 and concentrically within the control housing 36 is a substantially cylindrical latch or pawl housing 42. Centrally located within the latch housing 42 are a pair of parallel line passages 43, the interior ends of which communicate with an inlet line hole 44 formed in the base plate 35 for receiving both extender lines 21 and 30. The outer ends of the line passages 43 communicate with the interior of a tubular shaft 45 fixed concentrically within the outer end portion of the latch housing 42 and projecting through a corresponding guide hole 46 in the button plate 38.

Communicating with the line passages 43 in the latch housing 42 and extending substantially radially, but parallel, therefrom to open through the outer surface of the pawl housing 42 are a pair of pawl slots 47, each slot 47 receiving an elongated pawl 48. Each pawl 48 is pivotally mounted within a corresponding slot 47 by a transverse pivot pin 49 extending substantially through the mid-portion of the corresponding pawl 48. Coiled around each pivot pin 49 and fixed to the corresponding pawl 48 is a spring or spring member 50 to bias the foot or clamp end 51 of the corresponding pawl 48 into its corresponding line passage 43 to engage and hold within the passage 43 the corresponding extender line 21 or 30, respectively, in a locked or latched position. The opposite outer or actuator end 52 of each corresponding pawl 48 projects radially outward from the cylindrical latch housing 42 toward the wall of the control housing 36, as best illustrated in FIGS. 8 and 10.

The plunger member 37 has an outer cylindrical wall surface 53 slidably engaging the interior cylindrical wall surface of the control housing 36. The plunger member 37 is also provided with a cylindrical cavity having an outer cylindrical wall 54 which slidably engages the outer cylindrical wall of the latch housing 42. Thus, the plunger member 37 is confined between the exterior of the latch housing 42 and the interior of the control housing 36 for linear slidable movement. Moreover, the shaft guide hole 46 guides the exterior cylindrical surface of the tubular shaft 45 for linear reciprocal movement.

Figure 5:
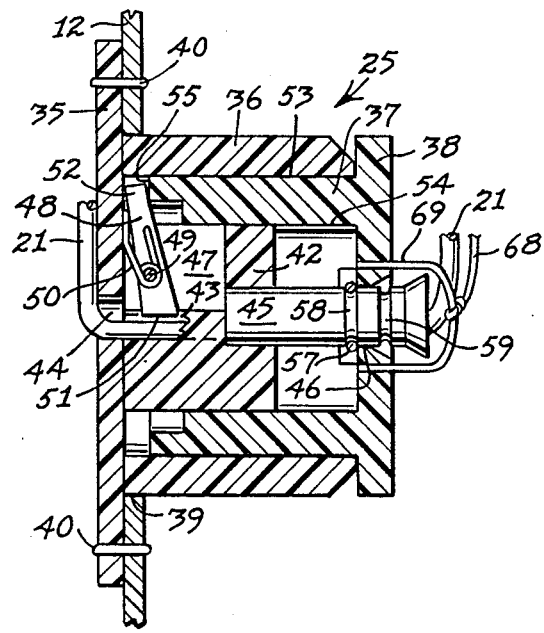
FIG. 5 is an enlarged fragmentary, transverse section taken along the line 5—5 of FIG. 2, illustrating the control member in its unlatched position.

When the plunger member 37 is thrust into the control housing 36, the inner annular end or actuator end 55 of the plunger member 37 engages the outer ends 52 of the pawls 48 to cause them to pivot, as best illustrated in FIG. 5, so that the pawl feet 51 disengage their corresponding extender lines 21 and 30 in an unlocked or unlatched position. Thus, in the contracted or unlatched position of the plunger member 37, the extender lines 21 and 30 are free to move in either direction through the control member 25.

Figure 8:
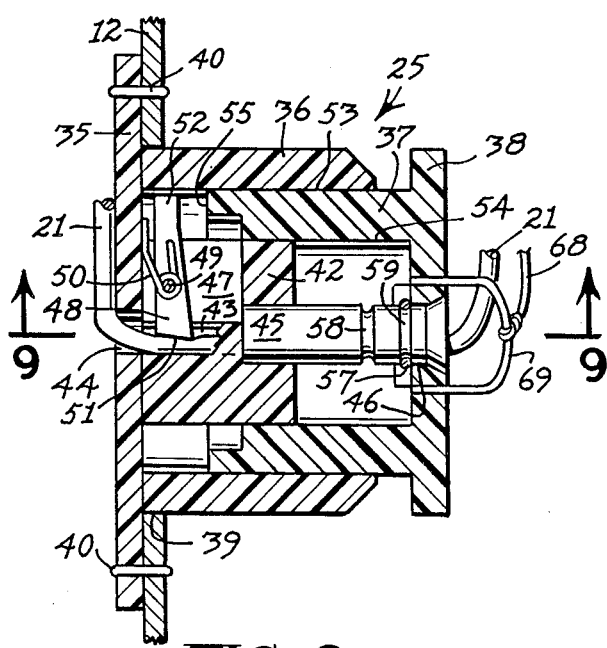
FIG. 8 is a fragmentary, transverse sectional view similar to FIG. 5, with the control member in its latched position.

On the other hand, when the plunger member 37 is retracted or withdrawn outward to the position disclosed in FIG. 8, the inner actuator end 55 disengages the outer ends 52 of the pawls 48 to permit the springs 50 to bias the pawls 48 inward until their feet or clamp ends 51 engage their corresponding extender lines 21 and 30 in the locked or latched position to prevent them from being withdrawn into the suit body 12. However, even when the pawls 48 are biased into engagement with the extender lines 21 and 30, in their latched position, the extender lines are still free to move in one direction, outward, beneath the biased pawls 48.

The plunger member 37 is retained in its depressed or retracted position by the snap ring 57 engaging one or the other of the longitudinally spaced annular grooves 58 and 59, respectively, as illustrated in FIGS. 5 and 8.

After the extender lines 21 and 30 pass through the tubular shaft 45 and the button plate 38, their free ends are connected to a common handle or handle member 60, which is located upon the outer surface of an elastic cover member 61. The extender lines 21 and 30 extend through corresponding holes within the cover member 61, so that the extender lines lie within the cover 61 while the handle member 60 lies on the outside of the cover member 61. The elastic cover member 61 is designed to cover the control housing 36 and the button plate 38, as illustrated in FIGS. 4 and 7.

Figure 4:
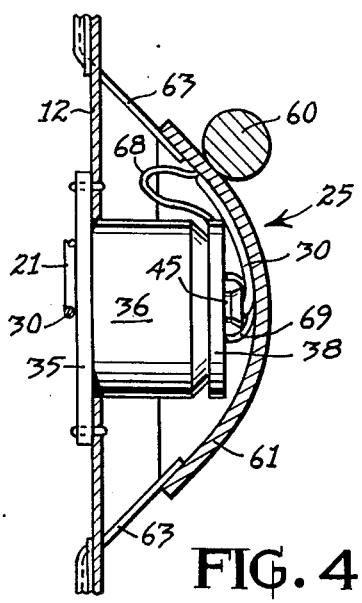
FIG. 4 is a fragmentary, transverse section taken along the line 4—4 of FIG. 2, illustrating the control member with the handle member retracted and the extender lines unlatched.
Figure 6:
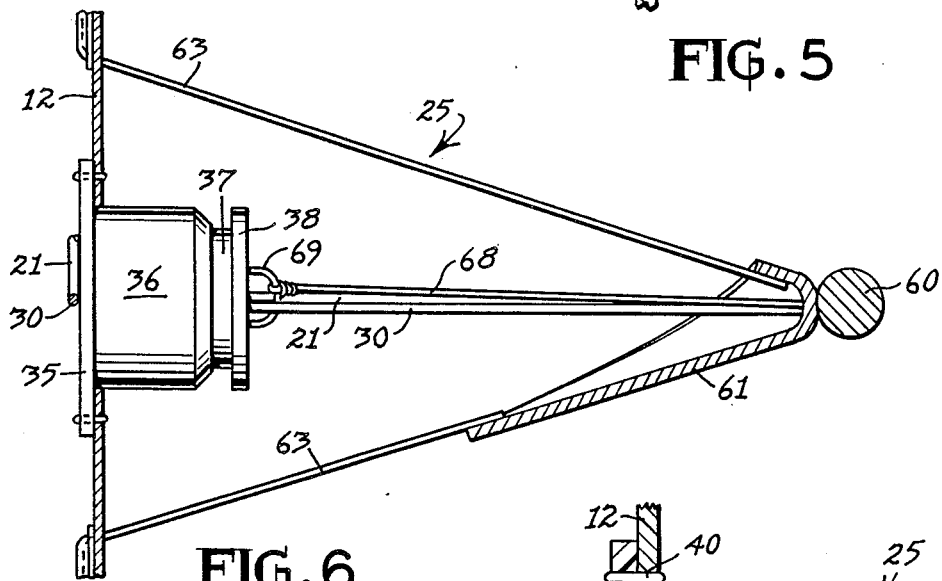
FIG. 6 is a sectional view similar to FIG. 4, with the handle member withdrawn outwardly to its fully extended 4 position, and with the withdrawn extender lines latched.
Figure 7:
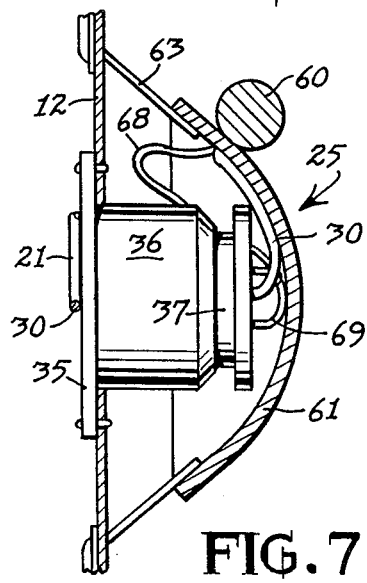
FIG. 7 is a sectional view similar to FIG. 6, with the handle member retracted.

Also, as illustrated in FIGS. 2, 4, and 7, the edge portions or corner portions of the cover member 61 are preferably attached to upper and lower elastic waist retainer straps 62 and 63 which extend through corresponding eyelets 64 in the suit body 12. The retainer straps 62 and 63 then pass through respective upper and lower fabric sleeves 65 and 66 stitched to the inside surface of the waist portion of the suit body 12, as best illustrated in FIGS. 1-6. With the combined elasticity of the upper and lower straps 62 and 63 and the cover member 61, the handle member 60, which is preferably attached to the cover member 61, may be pulled a substantial distance from the control housing 36, as illustrated in FIG. 6. In a preferred form of the invention, the handle member 60 may be preferably pulled about 6" away from the button plate 38, thus drawing the extender lines 21 and 30 a corresponding distance of 6" from the control member 25. Thus, the effective length of each extender line 21 and 30 is reduced by 6" within its corresponding wing area 17 and 18.

Also secured, either to the handle member 60, the cover 61, or one of the free end portions of the extender lines 21 and 30, is a lanyard 68, the opposite end of which is secured to a bail 69 fixed to the outside of the button plate 38. The lanyard 68 is of a length which determines the maximum extent of the pull of the handle member 60 away from the button plate 38. The lanyard 68 not only functions to limit the withdrawal distance of the handle member 60 and therefore the extender lines 21 and 30, but is also designed to pull the plunger member 37 outward to its retracted position disclosed closed in FIGS. 6 and 8, in order to disengage the outer ends 52 of the pawls 48. In this retracted position of the plunger member 37, the pawls 48 are free to be biased into engagement with the corresponding extender lines 21 and 30.

In the operation of the jumpsuit 11, the extender lines 21 and 30 are normally at full length to collapse the wing areas 17 and 18, as disclosed in FIG. 12. In this inoperative or collapsed position, the handle member 60 and cover member 61 are relaxed and the plunger member 37 may be in its depressed position as FIG. 5, unlatching the pawls 48 to permit free passage of the extender lines 21 and 30 in either direction through the control member 25. In the inoperative or collapsed position as disclosed in FIG. 12, the skydiver 10 is free to freefall at maximum velocity.

When the skydiver 10 desires to reduce his velocity during freefall, he grasps the handle 60 with his left hand 32, as disclosed in FIG. 13. Then he pulls the handle 60 outward, away from his suit 11, as illustrated in FIG. 14, to its maximum extent, as illustrated in FIG. 6. In this position, the plunger member 37 is retracted from the control housing 38 to disengage the pawls 48 and permit the pawls 48 to assume their latching positions permitting only one-way passage of the extender lines 21 and 30 away from the suit, out preventing any inward movement of the lines. As the lines are extended from the control housing 25, their effective lengths between the waist and the wrist are reduced, as illustrated in FIG. 1, to project or expand the wing areas 17 and 18, and to hold the wing areas 17 and 18 in their expanded positions, as long as the arms 19 and 20 of the wearer 10 are extended, as illustrated in FIG. 1. In this operative, or expanded position of the wing areas, the wearer 10 is free to maneuver in freefall at a reduced speed.

In FIG. 14, when the extender lines 21 and 30 have been effectively shortened by pulling the handle 60 outward, the left wing area 18 does not effectively expand as long as the wearer's left arm is down as shown in FIG. 14. In FIG. 14, the wearer's right arm is raised with the elbow bent to prevent the skydiver 10 from rotating in flight. Moreover, as long as the right elbow is bent, the right wing area 17 does not expand, primarily because the right extender line 21 slips off the elbow.

Then, when the wearer 10 desires to restore his maximum velocity, he merely takes his left hand 32 and pushes inward or strikes the button plate 38 through the cover member 61, as illustrated in FIG. 15, to depress the plunger member 37.

The depressed plunger member 37 engages the free ends 52 of the pawls 48 and to de-actuate or to unlock the pawls 48 from engagement with the corresponding extender lines 21 and 30. When the button plate 38 is struck, the cover member 61 and handle member 60 are already in their collapsed position with the lanyard 68 and the free end portions of the extender lines 21 and 30 within the cover member in a coiled or collapsed position, so that the lines 21 and 30 are free to move inward through the tubular shaft 25, the line passages 43, the inlet hole 44, and back into the wing areas 17 and 18.

This withdrawal of the extender lines is made possible by the elastic type of fabric out of which the jumpsuit 11 is made. The fabric of a jumpsuit 13 is preferably of a stretch-type knit fabric, at least in the wing areas 17 and 18 to permit elastic retraction of the wing areas and therefore withdrawal and effective lengthening of the extender lines 21 and 30.

It is therefore apparent, that a jumpsuit 11 has been designed in which the wing areas 17 and 18 may be quickly, simply, and reliably controlled to expand or contract instantly at the command of the wearer 10 and only when the corresponding freefall speed is desired.

What is claimed is:

1. A jumpsuit for controlled freefalling comprising:
   (a) a suit body adapted to fit the wearer and having a torso portion and sleeve portions connected to opposite sides of the torso portion, said sleeve portions being adapted to receive the arms of the wearer,
   (b) said suit body having an expansible wing portion interconnecting each said sleeve portion with said torso portion,
   (c) a wing extender line received within each wing portion, each extender line having outer and inner end portions,
   (d) means for holding each said outer end portions fixed relative to its corresponding sleeve portion,
   (e) a control member mounted relative to said suit body within the reach of the wearer of said body, and
   (f) a control member cooperating with both said inner end portions and having means for pulling said inner end portions to decrease the effective length of said extender lines within said corresponding wing portions, and to expand said corresponding wing portions relative to said suit body when said sleeve portions are extended laterally away from said suit body, to increase the air drag on said jumpsuit.

2. The invention according to claim 1 in which said control member further comprises latch means for locking said inner end portions relative to said control member to prevent an increase in the effective length of said extender lines, and for unlocking said inner end portions to permit free movement of said extender lines within said wing portions.

3. The invention according to claim 2 in which said control member comprises a control housing through which both said extender lines pass, said latch means comprising spring-biased pawl means normally biased into engagement with the free end portions of said extender lines to lock said extender lines against movement toward said sleeve portions, yet permit movement of said extender lines away from said sleeve portions.

4. The invention according to claim 3 in which said latch means further comprises means for releasing said pawl means from engagement with the free end portions of said extender lines to permit free movement of said extender lines toward and away from said sleeve portions.

5. The invention according to claim 4 in which said pawl means further comprises an elongated pawl for each extender line, each pawl having a clamp end and an actuator end, means pivotally mounting said pawls in said control housing between said ends, and spring means biasing said clamp ends toward engagement with corresponding inner end portions of said extender lines as said lines pass through said control housing, an unlatching member movable within said control housing to engage said actuator end to release said clamp ends from said extender lines.

6. The invention according to claim 5 in which said unlatching member comprises a plunger member adapted to be manually depressed into said control housing to engage said actuator ends, a handle member connected to the inner end portions of said extender lines on the outside of said control housing, and means connecting said handle member to said plunger member to retract said plunger member from engagement with said actuator ends when said handle member is pulled outwardly to relock said extender lines.

7. The invention according to claim 6 further comprising means for retracting said handle member toward said control housing.

8. The invention according to claim 1 in which said control member is mounted on said body suit in the vicinity of the waist of the wearer.

9. The invention according to claim 1 in which said means for holding each said outer end portion comprises a hand loop fixed to the outer end portion of each of said extender lines projecting outward beyond said sleeve portion and adapted to be engaged by each corresponding hand of the wearer.

* * * * *